United States Patent Office 3,036,132
Patented May 22, 1962

3,036,132
PRODUCTION OF ORGANOPHOSPHORUS COMPOUNDS
Sam B. Becker, Chicago, Ill., assignor to Standard Oil Company, Chicago, Ill., a corporation of Indiana
No Drawing. Filed June 22, 1954, Ser. No. 438,637
6 Claims. (Cl. 260—606.5)

This invention relates to a process for the preparation of organophosphorus compounds and particularly to a process for substituting one or more halogen atoms contained in phosphorus-halogen compounds by hydrocarbon groups. One specific aspect of this invention involves the alkylation of trivalent phosphorus halides or their organic derivatives containing at least one phosphorus-halogen bond by metathetical reaction with aluminum alkyls and similar compounds.

The alkylation of phosphorus trichloride has heretofore been effected through the use of diethyl zinc, dibutyl mercury, lead tetraethyl and Grignard reagents, among other methods. The hydrocarbon derivatives of zinc, lead and mercury, particularly those of relatively low molecular weight, are extremely poisonous. Tetraphenyl lead is not an efficient arylating agent since it becomes stabilized at the diphenyl lead dichloride stage. Lead tetraethyl is inefficient, since upon metathetical reaction with metal halides such as aluminum chloride, it is converted to diethyl lead dichloride, which is unstable and decomposes to form some ethyl chloride, thus losing an ethyl group for purposes of alkylation (H. Gilman and L. D. Apperson, J. Org. Chem. 4, 162–8 (1939)). In addition, the zinc alkyls are extremely inflammable materials. Grignard reagents usually require the use of large amounts of dangerous low-boiling solvents such as diethyl ether.

It is an object of this invention to provide a method for producing hydrocarbon-substituted phosphorus compounds. An additional object of this invention is to provide an improved process for the introduction of aliphatic or aromatic hydrocarbon radicals into phosphorus compounds comprising at least one phosphorus-halogen bond by a metathetical reaction. An additional object of this invention is to provide novel reagents for the introduction of hydrocarbon radicals into phosphorus-halogen compounds or analogous compounds. These and other objects of my invention will become apparent from the ensuing description thereof.

Briefly, this invention comprises effecting metathesis between a phosphorus-halogen compound and a compound having the general formula $AlR_3$ or $M(AlR_4)_n$, wherein R is a monovalent hydrocarbon radical, M is selected from the class consisting of alkali metals and alkaline earth metals and $n$ is the valence of M. My invention is particularly applicable to the reaction of phosphorus trihalides, especially phosphorus trichloride and phosphorus tribromide, with alkali metal aluminum alkyls or alkali metal aluminum aryls to produce compounds having the general formulas $R_3P$, $R_2PX$ and $RPX_2$, wherein R is an alkyl or aryl radical and X is a halogen such as chlorine or bromine. The proportions of the phosphorus compound and aluminum compound can be regulated and the other reaction conditions (such as the order of addition) can be regulated to maximize the yield of the desired hydrocarbon-substituted phosphorus compound. The reactions in question are extremely exothermic and can be effected over an extremely broad temperature range, usually between about −50° C. up to about 100° C., although even higher temperatures may sometimes be used if arrangements are made to remove and condense volatile materials passing overhead of the reaction zone. It is usually desirable, although not absolutely essential, to employ inert solvents or diluents in the reaction zone, wherein they function to dissolve reacting materials and products and to absorb some of the heat released during the reaction. Especially useful solvents or diluents include unreactive hydrocarbons such as the saturated hydrocarbons and the aromatic hydrocarbons. The invention will be described in somewhat greater detail hereinbelow.

Suitable phosphorus compound charging stocks comprise the phosphorus trihalides, viz trifluoride, trichloride, tribromide and triiodide of phosphorus. Phosphorus trifluoride is a relatively expensive, extremely volatile compound (B.P. −95° C.), which requires the use of pressure equipment in effecting reaction. Phosphorus triiodide is also expensive and somewhat unstable, although it can be used for the present purposes. Phosphorus trichloride and tribromide are the preferred trihalide charging stocks for the process of the present invention.

The present invention can also be employed for the introduction of one or more monovalent hydrocarbon radicals into phosphorus compounds, particularly those containing trivalent phosphorus and containing a phosphorus-halogen bond, for example compounds having the general formula $PR_nX_{3-n}$, wherein R is a monovalent hydrocarbon radical, X is a halogen and $n$ has a value of 1 or 2. Thus, R can be an unsubstituted aryl radical or an alkaryl radical. These compounds are known as halophosphines.

In the compounds having the generic formula $$M(AlR_4)_n$$

M is an alkali metal or an alkaline earth metal, viz a metal selected from the group consisting of lithium, sodium, potassium, rubidium, cesium, beryllium, magnesium, calcium, strontium, and barium; R is a monovalent hydrocarbon radical and $n$ is the valence of M, viz 1 in the case of the alkali metals and 2 in the case of the alkaline earth metals. The so-called aluminum sesquihalides, $R_2AlX$ and $RAlX_2$, wherein R is a monovalent hydrocarbon radical and X is halogen, can also be employed to effect the alkylation of phosphorus compounds containing a phosphorus-halogen bond, in lieu of or in addition to the $AlR_3$ compounds or the $M(AlR_4)_n$ compounds. It appears probable that aluminum sesquihalides are produced as intermediate products in the course of the alkylation of phosphorus-halogen compounds, but are ultimately consumed, with the formation of $AlX_3$.

The monovalent hydrocarbon group contained in the phosphorus-containing feed stock, the aluminum compound feed stock, or attaching itself to the phosphorus compound feed stock in the course of the reaction of this invention is a monovalent hydrocarbon radical such as an aliphatic hydrocarbon radical, viz: alkyl, cycloalkyl-alkyl, alkyl-cycloalkyl, aryl-alkyl, aryl-cycloalkyl, cycloalkyl, alkenyl or cycloalkenyl radicals.

Illustrative examples of R groups include:

methyl, ethyl, n-propyl, isopropyl, isobutyl, n-amyl, isoamyl, hexyl, n-octyl, n-dodecyl, and the like;
2-butenyl, 2-methyl-2-butenyl and the like;
cyclopentyl-methyl, cyclohexyl-ethyl, cyclopentyl-ethyl, methylcyclopentyl-ethyl, 4-cyclohexenylethyl and the like;
2-phenylethyl, 2-phenylpropyl, 2-naphthylethyl, methylnaphthylethyl, and the like;
cyclopentyl, cyclohexyl, 2,2,1-bicycloheptyl and the like;
methylcyclopentyl, dimethylcyclopentyl, ethylcyclopentyl, methylcyclohexyl, dimethylcyclohexyl, ethylcyclohexyl, isopropylcyclohexyl, and the like;
phenylcyclopentyl, phenylcyclohexyl, the corresponding naphthyl derivatives of cycloalkyl groups, and the like;
phenyl, tolyl, xylyl, ethylphenyl, xenyl, naphthyl, methylnaphthyl, dimethylnaphthyl, ethylnaphthyl, and the like.

The preparation of the phosphorus-containing and aluminum-containing reactants by a variety of methods is well known in the art and, per se, forms no part of the present invention. Aluminum alkyls can be conveniently prepared by the reaction of aluminum hydride with olefins. Similarly, lithium aluminum tetraalkyls can be conveniently prepared by the reaction of non-tertiary olefins with lithium aluminum hydride. Various methods may be employed to produce aluminum alkyls of unsymmetrical structure. For example, dimethyl propyl aluminum may be prepared by the reaction of methyl chloride with an aluminum-magnesium alloy to yield dimethyl aluminum chloride, which is treated with sodium hydride to produce dimethyl aluminum hydride and the hydride is treated with propylene to yield the desired charging stock.

The reaction of the present invention is highly exothermic. It can proceed at a measurable or high rate over an extremely broad temperature range. Temperatures in the range of about −50° C. to about +100° C. are usually selected for purposes of convenience, although reaction may be effected even outside this range. A preferred range of temperatures from the standpoint of convenience of operation and efficiency of reaction is between about 10° C. and about 75° C. Temperature control during the reaction is effected by withdrawing the heat of reaction at a rate sufficient to maintain the desired reaction temperature. Heat withdrawal from the reaction zone may be effected by conventional means such as various external heat exchange arrangements; by refluxing a relatively volatile inert solvent from the reaction mixture under desired pressure, condensing the vapors and returning them to the reaction zone; by the use of relatively large volumes of inert solvents or diluents having a suitably high heat capacity, particularly saturated and aromatic hydrocarbons. Suitable saturated hydrocarbon solvents or diluents include the alkanes such as butanes, pentanes or, preferably, higher boiling alkanes such as n-heptane, octane, dodecane, mineral white oil, or the like; cycloalkanes such as cyclopentane, alkylcyclopentanes, cyclohexane and alkylcyclohexanes, and decahydronaphthalene; aromatic hydrocarbons such as benzene and alkylbenzenes, naphthalene and alkylnaphthalenes, tetrahydronaphthalene; olefinic hydrocarbons such as 2-methylpentene, 2-ethylhexene, 2-octyldodecene, 2-heptene and the like. The specific solvents will be chosen with regard to the particular reaction conditions which are selected so that the solvent or diluent will be employed as a liquid or liquid-vapor mixture in the reaction zone.

The reaction may be effected at atmospheric pressure or superatmospheric pressures. Ordinarily the reactions in question do not proceed with substantial pressure change, so that the selection of the desired pressure is based principally upon physical considerations involved in the reaction, for example, the boiling point of the reaction solvent or diluent.

Since the reactants and the products react readily with oxygen and water in the atmosphere, it is necessary to effect reaction to the exclusion of these materials and also of impurities such as sulfur compounds or acetylene. The reaction may be effected under an atmosphere of helium, nitrogen or other inert gas, or hydrogen; alternatively, a blanket of inert hydrocarbon gas, for example, ethane or propane, may be supplied over the surface of the reaction mixture to prevent access of atmospheric oxygen or moisture to the reactants.

Following reaction, the reaction mixture may be separated by conventional means such as solvent extraction, crystallization, or distillation in order to isolate the hydrocarbon-substituted phosphorus compounds which result from the reactions of this invention.

By proper control of the ratio of equivalents of phosphorus-containing reactant to the aluminum-containing reactant, it is possible to control the extent of hydrocarbon substitution in the phosphorus compound. Thus, a large molar excess of hydrocarbon-substituted aluminum reactant relative to the phosphorus-halogen containing reactant tends to drive hydrocarbon substitution to completion with the production of phosphorus compounds which are fully substituted by hydrocarbon radicals, for example, tertiary phosphines having the formula $R_3P$. As will be shown by the specific examples supplied hereinafter, the reactions can be controlled to yield intermediate products of hydrocarbon substitution into the phosphorus-halogen reactants.

The following examples are supplied in order to provide specific illustrations of the reactions of my invention. It should be understood, however, that they are not intended to and, in fact, do not delimit the scope of this invention.

In the following examples the general procedure comprised the contacting of lithium aluminum hydride in a strainless steel autoclave provided with a magnetically-actuated reciprocating stirrer (250 ml. Magne-dash reactor) with an excess of propylene to form lithium aluminum tetrapropyl which contained small proportions of a hexyl group also. The lithium aluminum tetrapropyl reagent in benzene was then reacted with $PCl_3$, added as a benzene solution.

In the preparation of lithium aluminum tetrapropyl, the lithium aluminum hydride was placed into the Magne-dash reactor in a nitrogen atmosphere which was then replaced by hydrogen. Fifty ml. of pure dry benzene was then charged, following which propylene was added and the temperature was raised to 150° C. in about 20 minutes. At this point a sharp temperature rise of 50° C. occurred without much change in propylene pressure, indicating reaction with consumption of propylene. The reactor was then cooled and the unreacted propylene was recovered in a Dry Ice trap. The consumption of propylene corresponded well with the formation of lithium aluminum tetrapropyl, although it appears that a very small proportion of hexyl groups was present in the lithium aluminum tetraalkyl product, due to the dimerizing addition of propylene, which is well known in the art. The propylation product formed a jelly in the relatively small amount of benzene which was present, but this was dissolved by the addition of additional amounts of benzene at room temperature.

In Example 1 the object was to prepare propyl phosphorus dichloride. In order to favor this object, the benzene solution of lithium aluminum tetrapropyl was slowly added over the course of some three hours, to a cooled flask containing an excess of phosphorus trichloride dissolved in benzene. The benzene solution was filtered in an inert atmosphere and the benzene and excess of $PCl_3$ removed by distillation at one atmosphere to 128° C. (pot temperature). It will be noted from the chlorine analysis in Example 1 that a substantial yield of the propyl phosphorus dichloride was actually produced. The chlorine content of the products was somewhat lower than theoretical due to the formation of some dipropyl phosphorus chloride and possibly some hexyl phosphorus dichloride.

In Example 2 the object was to prepare principally dipropyl phosphorus chloride. The benzene solution of lithium aluminum tetrapropyl was stirred in a glass flask under a nitrogen atmosphere and cooled while a solution of phosphorus trichloride in benzene was added thereto over the course of about one hour. The benzene solution was filtered in a nitrogen atmosphere, and the benzene removed by distillation at one atmosphere to a bottoms temperature of 175° C.

Both Examples 1 and 2 were effected under atmospheric pressures, Example 1 at 25 to 40° C., and Example 2 at 30 to 38° C.

In Example 3 the object was to prepare tripropyl phosphine. To this end, the lithium aluminum tetrapropyl was employed in substantial excess to allow for impurities and side reactions as encountered in Example 2, and the tripropyl phosphine product was distilled from the reaction mixture to separate it from the excess lithium aluminum tetrapropyl. Lithium aluminum tetrapropyl was transferred in a nitrogen atmosphere along with 650 ml. of benzene to a 1 liter three-necked flask fitted with a stirrer. This amount of benzene was not quite sufficient to dissolve all of the metal alkyl. The $PCl_3$ in 50 ml. of benzene was added slowly while the contents of the flask were cooled to below 40° C. The reaction mixture was settled and the clear solution decanted in a nitrogen atmosphere to separate it from solid inorganic salts. After the benzene was removed by distillation, a residue of 22 g. remained. This residue was distilled to a bottoms temperature of about 300° C. at one atmosphere. Nine grams of grey mud remained which was evidently the excess of metal alkyl and lithium chloride and aluminum chloride. It reacted vigorously with water to evolve an inflammable gas. Approximately 7 grams of the distillate were obtained in the form of a clear, non-viscous liquid which had the characteristic odor of an alkyl phosphine. The fact that it is the tripropyl phosphine is further shown by the low chlorine content, the correct specific gravity and the extreme reactivity with oxygen in the air to form a white solid. The 65% yield (base on $PCl_3$) could have been raised substantially by a more thorough separation of benzene solution from the lithium chloride and aluminum chloride salts.

The specific data of the examples are tabulated hereinbelow:

TABLE

A. Formation of Lithium Aluminum Alkyl

| Example No | 1 | 2 | 3 |
|---|---|---|---|
| Gm. of $LiAlH_4$ used | 4.4 | 4.4 | 4.4 |
| Ml. benzene in charge | 50 | 50 | 50 |
| Gm. propylene in charge | 44 | 45 | 42 |
| Equiv. propylene in charge | 1.05 | 1.07 | 1.0 |
| P.s.i.g. at 150° C | 700 | 700 | 700 |
| Gm. propylene recovered | 22 | 22 | |
| Gm. propylene reacted | 22 | 23 | 22 |
| Gm. propylene theoret. needed | 19.5 | 19.5 | 19.5 |

B. Reaction of $PCl_3$ and Lithium Aluminum Alkyl

| | | | |
|---|---|---|---|
| Total ml. benzene used as solvent | 900 | 765 | 700 |
| Gm. $PCl_3$ used | 67 | 13 | 9.3 |
| Theor. percent Cl in $ClP(Propyl)_2$ | | | 23 |
| Theor. percent Cl in $Cl_2P$-Propyl | 49 | | |
| Percent Cl in actual products | 41 | 19 | |
| B.P. of product, ° C | 128 up | 175 up | |
| Yield of product, Gm | 25 | 25 | |
| Percent Cl in distilled product | | | 0.40 |
| Sp. g. of distilled product | | | 0.80 |
| Sp. g. of tripropyl phosphine (literature) | | | 0.81 |
| Gm. of distilled product | | | 7 |
| Percent yield of product based on $PCl_3$ used | | | 64.5 |

The phosphorus-hydrocarbon products of the present invention and/or derivatives which are readily preparable therefrom by oxidation, sulfurization or other chemical conversion, are useful for a large variety of purposes, for example as chemical reaction intermediates, lubricating oil addition agents, hydraulic fluids, components of insecticidal compositions, as motor fuel components, diesel fuel components and for many other purposes.

Having thus described my invention, what I claim is:

1. The process which comprises effecting reaction in an inert atmosphere between a compound having the formula $PR_nX_{3-n}$, wherein R is a monovalent hydrocarbon radical selected from the class consisting of saturated hydrocarbon radicals, olefinic hydrocarbon radicals, unsubstituted aryl radicals and alkaryl radicals, X is a halogen and $n$ is a value selected from 0, 1 and 2, and a compound selected from the group consisting of $AlR'_3$ and $MAlR'_4$ wherein R' is an alkyl radical and M is an alkali metal, and separating as a reaction product a compound having the general formula $PR_n(R')_{n'} \cdot X_{3-n-n'}$ wherein $n'$ is at least 1 but not more than $(3-n)$.

2. The process which comprises effecting reaction in an inert atmosphere between a phosphorus trihalide and an alkali metal aluminum tetraalkyl, and separating an alkylated phosphorus compound selected from the class consisting of mono-alkyl dihalophosphines, dialkyl monohalophosphines and tertiary alkyl phosphines thus produced.

3. The process of claim 2 wherein the phosphorus trihalide is phosphorus trichloride and the alkali metal aluminum tetraalkyl is lithium aluminum tetrapropyl.

4. The process of claim 1 wherein said compound having the formula $PR_nX_{3-n}$ is phosphorus trichloride.

5. The process of claim 1 wherein said compound having the formula $PR_nX_{3-n}$ is phosphorus tribromide.

6. A process for the preparation of a trialkyl phosphine which comprises reacting phosphorus trifluoride and aluminum trialkyl in an inert atmosphere and separating said trialkyl phosphine from the reaction mixture.

References Cited in the file of this patent

UNITED STATES PATENTS 2,247,821    Ruthruff _____ July 1, 1941

OTHER REFERENCES

Kosolapoff: Organophosphorus Compounds (1950, Wiley & Sons), pp. 43–46.

Krause et al.: Die Chemie der Metallorganischen Verbindungen (1943, Edwards Brothers), pp. 227–8.